(12) United States Patent
Lesage

(10) Patent No.: US 10,393,405 B2
(45) Date of Patent: Aug. 27, 2019

(54) DUAL/MULTI ENERGY GAS WATER HEATER

(71) Applicant: MICLAU-S.R.I. INC., Montreal East (CA)

(72) Inventor: Claude Lesage, Pointe-Claire (CA)

(73) Assignee: MICLAU-S.R.l. INC., Montreal East, Quebec ( * ) Notice: Subject to any disclaimer, the term of this patent is extended or adjusted under 35 U.S.C. 154(b) by 309 days.

(21) Appl. No.: 14/756,333

(22) Filed: Aug. 31, 2015

(65) Prior Publication Data
US 2017/0059206 A1    Mar. 2, 2017

(51) Int. Cl.
*F24H 1/00* (2006.01)
*F24H 1/20* (2006.01)
(Continued)

(52) U.S. Cl.
CPC .......... *F24H 9/2007* (2013.01); *F24D 3/082* (2013.01); *F24D 17/0068* (2013.01); *F24H 1/185* (2013.01); *F24H 1/186* (2013.01); *F24H 1/202* (2013.01); *F24H 1/205* (2013.01); *F24H 1/206* (2013.01); *F24H 1/208* (2013.01); *F24H 1/28* (2013.01); *F24H 9/1818* (2013.01);
(Continued)

(58) Field of Classification Search
CPC .......... F24H 1/185; F24H 1/186; F24H 1/202; F24H 1/205–207; F24H 1/208; F24H 9/2007; F24H 9/2021; F24H 9/2035; F24H 1/22; F24H 1/24–28; F24H 1/34; F24H 1/36; F24H 1/40; F24H 1/44; F24H 1/48–52; F24H 1/00; F24H 1/20; F24H 9/1818; F24H 9/20; F24H 9/2014; F24H 9/2085; H05B 1/0202; H05B 1/0269; H05B 1/0283; H05B 3/40; H05B 3/78; H05B 3/82; H05B 3/42; H05B 3/03; F24D 3/082; F24D 17/0015; F24D 17/0021; F24D 17/0036; F24D 17/0063; F24D 17/0068
USPC .......... 392/308, 311–314, 322, 465; 219/200
See application file for complete search history.

(56) References Cited

U.S. PATENT DOCUMENTS 3,134,008 A * 5/1964 Finn ...................... H05B 1/0208
219/483
9,574,793 B2 * 2/2017 Furmanek ............. F24H 9/2035
(Continued)

*Primary Examiner* — Michael G Hoang
(74) *Attorney, Agent, or Firm* — Guy J. Houle; Houle Patent Agency Inc.

(57) ABSTRACT

A dual energy gas water heater is described and wherein a square flange, curved resistor style resistive heating element, is secured in a bottom portion of the tank of the water heater spaced above a top wall of the combustion chamber. A gas burner is secured in the combustion chamber and connected to a gas supply line through a gas valve. The curved resistive heating element is a low density, long life, element having a density in the range of about 20 to 80 watts/sq. inches. A switch is secured between the thermostat of the resistive heating element and the voltage supply line. A controller selectively operates the switch and the gas valve to disconnect the voltage supply line from the thermostat and/or shut-off the gas valve secured to the gas supply line depending on the desired source of energy. The controller is adapted to be optionally controlled by a utility/provider through a communication link. Renewable energy source may also be secured to an additional resistive heating element to improve the efficiency thereof.

14 Claims, 3 Drawing Sheets

(51) Int. Cl.
*F24H 1/26* (2006.01)
*F24H 1/44* (2006.01)
*F24H 1/52* (2006.01)
*F24H 1/34* (2006.01)
*F24H 9/20* (2006.01)
*F24H 1/22* (2006.01)
*F24D 3/00* (2006.01)
*F24D 17/00* (2006.01)
*H05B 3/42* (2006.01)
*H05B 3/82* (2006.01)
*H05B 3/03* (2006.01)
*F24H 1/18* (2006.01)
*F24H 1/28* (2006.01)
*F24D 3/08* (2006.01)
*F24H 9/18* (2006.01)

(52) U.S. Cl.
CPC ......... *F24H 9/2021* (2013.01); *F24H 9/2035* (2013.01); *H05B 3/03* (2013.01); *H05B 3/42* (2013.01); *H05B 3/82* (2013.01)

(56) References Cited

U.S. PATENT DOCUMENTS

| | | | |
|---|---|---|---|
| 2005/0281547 A1* | 12/2005 | Sauvageau | F24D 11/00 392/432 |
| 2007/0212036 A1* | 9/2007 | Halsall | F24H 1/202 392/451 |
| 2008/0205865 A1* | 8/2008 | Lesage | F24H 1/202 392/454 |
| 2013/0263843 A1* | 10/2013 | Kreutzman | F24D 11/004 126/615 |
| 2014/0112647 A1* | 4/2014 | Lichtenberger | F24H 1/202 392/308 |
| 2014/0137813 A1* | 5/2014 | Gross | F25B 27/02 122/18.3 |
| 2014/0265573 A1* | 9/2014 | Kreutzman | F24H 1/0018 307/31 |
| 2015/0110478 A1* | 4/2015 | Cardoso | F24H 9/0021 392/452 |
| 2015/0354833 A1* | 12/2015 | Kreutzman | F24D 19/106 392/308 |

\* cited by examiner

DUAL/MULTI ENERGY GAS WATER HEATER

TECHNICAL FIELD

The present invention relates to a dual energy gas water heater incorporating therein a resistive heating element whereby the water heater can be operated by a selected one of the energy sources, gas or electricity, and remotely during time periods when one of such energies is readily available or operated alternatively with both energies during certain periods in a day when such energy is at its less expensive rate or favourable for use.

BACKGROUND OF THE INVENTION

The majority of water heaters in use are of the storage type and their source of energy is either gas or electricity. Such energy sources are available from grids which are often in peak demand. Accordingly, the utility or the energy provider in extreme demand situations are forced to cut the energy source to some of their customers in order to reduce and control the load. In certain heavily populated cities like Los Angeles, Calif., for example, during summer time when the climate is hot, there is a huge demand for electricity by air conditioning devices and water heaters and the load on the grid is often at its maximum and thus requiring the utility/provider to do some load shedding depriving service sectors of electricity. Because electric water heaters are also large consumers of electricity they are rendered inoperative during load shedding period which occur during high demand times. This is an inconvenience to the consumer. It would be desirable to overcome this problem by the use of gas water heaters which do not rely on the electric grid. However, during winter months many households rely on gas heating which also results in peak demand periods for gas when electricity is now in surplus. In an attempt to overcome such problems, such utility providers offer programs where they can remotely control certain high consuming devices, such as air conditioners, space heating devices and water heaters, but such is not popular and as not proven successful.

As mentioned above, most water heaters are of the storage type and operated by electricity or gas. These sources of energy are expensive and particularly so during peak time periods. The loads created on the supply source is often too great to manage and the providers need to shed some of its load creating inconvenience to their customers. These storage type water heaters comprise a tank in which water from the supply line enters the tank at a temperature in the range of about 50 degrees F., and this varies depending on latitude and the seasons and the source of water, such as city supply or artesian well. A resistive heating element projecting in the tank or a burner disposed beneath the tank heats the water within the tank to a temperature typically in the range of from 105 to 120 degrees F. A resistive heating element which is immersed in water is substantially 100 percent efficient whereas gas water heater are much less efficient, usually in the range of from about 60 to 80 percent due to heat loss. Also, gas water heaters produce noise when the burner is operated as opposed to electric water heaters which do not produce noise when the elements are in use heating the water. Gas water heaters, however, heat water much more quickly than electric water heaters. It would be desirable to construct a water heater which overcomes the above mentioned disadvantages and which utilizes the advantages of both energy type water heaters. It would also be advantageous to utilise, in combination, a renewable energy source to reduce the demand on the electric grid or gas distribution network.

Electric utilities as well as gas utilities have a need to take control of water heaters to prevent excessive demand during peak hours and to use its electricity or gas when the demand and cost is low. Such control would create an equilibrium or a mean demand of electricity or gas. Control devices have been developed and continue to be developed to remotely control the demand for electricity or gas. It would therefore be desirable to construct a water heater which can be remotely controlled by a utility to shed load while at the same time does not deprive the consumer from having a continuous supply of hot water.

SUMMARY OF THE INVENTION

It is a feature of the present invention to provide a dual energy gas water heater which substantially overcomes the above mentioned disadvantages and which provides the above mentioned needs.

It is another feature of the present invention to provide a dual energy gas water heater which incorporates therein a resistive heating element to heat water within the tank of the water heater when necessary to do so and which is automatically and/or remotely controlled.

Another feature of the present invention is to provide a dual energy gas water heater which utilises one or more additional renewable energy sources to heat water within the tank of the water heater.

It is a still further feature of the present invention to provide a method of constructing a gas water heater as a dual energy source water heater inexpensively.

According to the above features, from a broad aspect, the present invention provides a dual energy gas water heater which is comprised of a tank for containment of water to be heated. A water inlet is secured to the tank for receiving water to be heated from a domestic water supply line. A water outlet is provided in a top portion of the tank for feeding hot water to a hot water supply line. A combustion chamber is provided in a lower portion of the tank and a gas burner is mounted in the chamber. A gas supply line is connected to the gas burner through a gas shut-off valve. A flue tube is sealingly secured to a top wall of the combustion chamber and extends vertically throughout the tank for heat exchange with water in the tank together with the top wall of the combustion chamber. A resistive heating element is secured in a lower portion of the tank above the combustion chamber. A resistive heating element is secured in a lower portion of the tank above the combustion chamber. The resistive heating element is a curved resistive heating element having a length greater than the distance between the wall of the tank to the flue tube and is curved to extend spaced about a portion of the flue tube. The curved resistive heating element has a density in the range of 20 to 80 watts/sq. inches and a length sufficient to heat water within the tank to a desired temperature. A thermostat is secured to the resistive heating element. A switch is secured between the thermostat and a voltage supply line. A controller is provided to selectively operate the switch and the gas valve to disconnect the voltage supply line from the thermostat and/or shut off the gas shut-off valve secured to the gas supply line.

According to a further broad aspect of the present invention there is provided a method of constructing a gas water heater as a dual energy source water heater. The method comprises securing a curved resistive heating element to a wall of a tank of the gas water heater at a location spaced above a top wall of a combustion chamber of the gas water heater in a lower portion the tank. The curved resistive heating element has a length greater than the distance between the wall of the tank to a flue tube extending centrally and vertically from the top wall of the combustion chamber. The curved resistive heating element extends in a curved portion thereof spaced from the flue tube. The curved resistive heating element is a low density, long life, resistive heating element having a density in the range of from about 20 to 80 watts/sq. inches and a length sufficient to heat water within the tank to a desired temperature.

DESCRIPTION OF THE DRAWINGS

A preferred embodiment of the present invention will now be described with reference to the accompanying drawings in which.

DESCRIPTION OF THE PREFERRED EMBODIMENT

Figure 1:
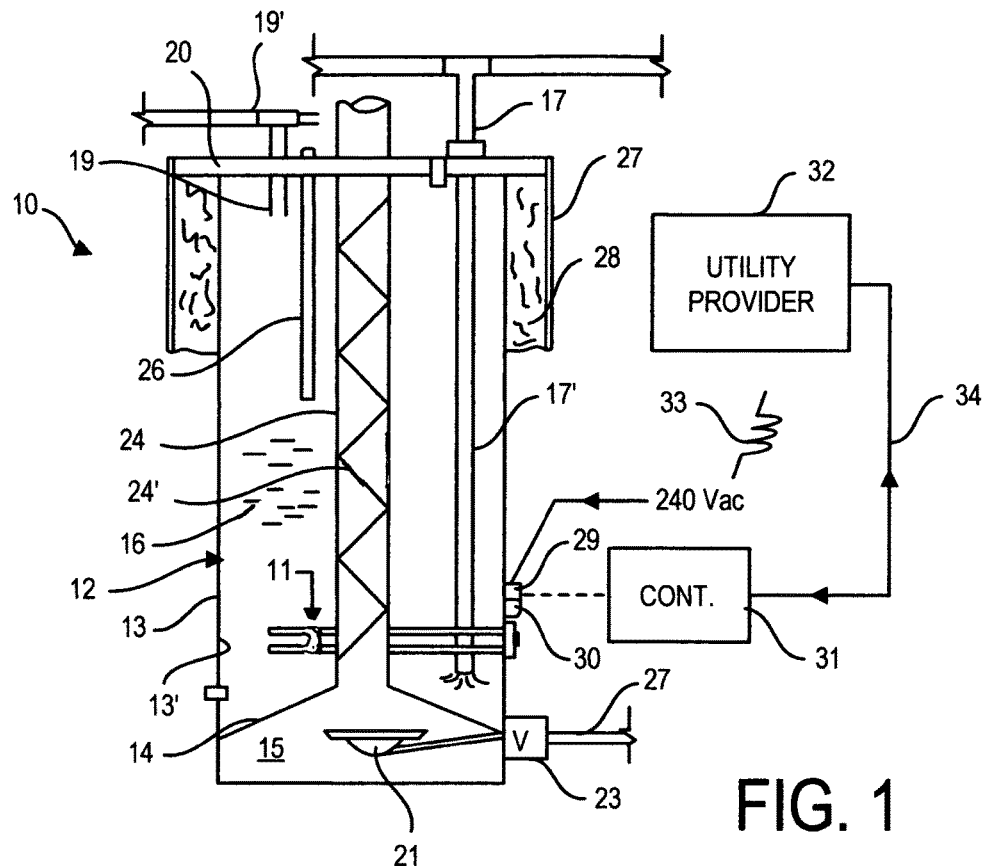
FIG. 1 is a simplified fragmented section view of a gas water heater constructed as a dual energy gas water heater wherein a resistive heating element is secured above the top wall of the combustion chamber and operated by a controller.
Figure 2:
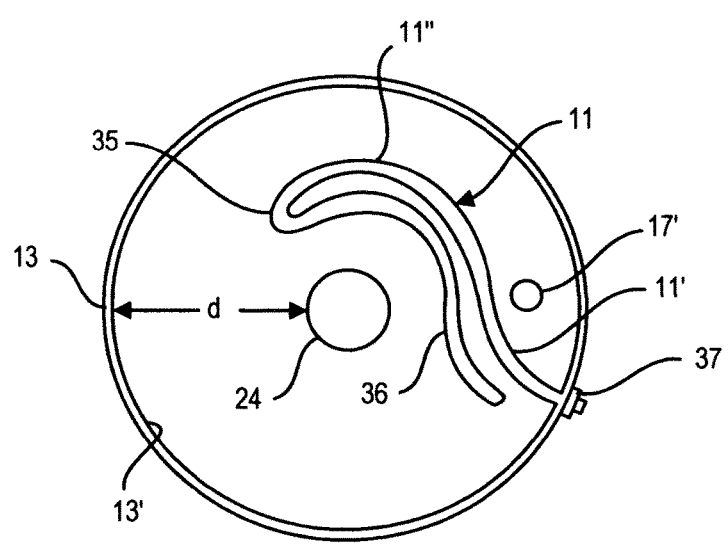
FIG. 2 is a transverse cross-section view of the tank showing the position of the curved resistive heating element relative to the flue tube and the tank sidewall.

Referring now to the drawings and more particularly to FIGS. 1 and 2, there is shown generally a 10 a gas-fired water heater constructed in accordance with the present invention and wherein a resistive heating element 11 is secured to the sidewall 13 of the tank 12 of the water heater above the top wall 14 of the combustion chamber 15 located at the bottom of the tank 12. The tank 12 is filled with water 16 to be heated from an inlet pipe 17 connected to the domestic water supply line 18. Water to be heated is released at the bottom of the tank via a dip tube 17'. A water outlet 19 is secured to the tank in a top portion thereof, herein the top wall 20 of the tank 12 and connected to a hot water supply line 19'. A gas burner 21 is supported in the combustion chamber 15 and a gas supply line 22 is connected thereto via a gas shut-off valve 23. A flue tube 24 is sealingly secured in a central portion of the top wall 14 of the combustion chamber 15 and extends centrally and vertically throughout the tank for heat exchange with the water 16 together with the top wall 14 of the combustion chamber. A flue baffle 24' is usually secured in the flue tube 24 to retard hot flue gases from the combustion chamber to provide a more efficient heat exchange with the water 16 within the tank 12. A sacrificial anode 26 extends within the tank to protect exposed steel within the tank from corrosion. The tank has an outer casing 27 secured spaced from the tank and an insulation 28 is disposed between the outer casing and the tank to provide thermal insulation.

With additional reference to FIGS. 3 and 4 there will now be described the resistive heating element 11 and its mounting to the tank wall 13. The resistive heating element 11 is a curved resistive heating element having a length greater than the distance between the inner surface 13' of the tank wall 13 and the flue pipe 24, namely the distance "d", herein indicated. As shown, the curved resistive heating element 11 extends into the tank about a portion of the flue tube 24 and spaced between the flue tube and the inner surface 13' of the side wall 13 of the tank. The curved resistive heating element is a low density, long life, resistive heating element having a density in the range of 20 to 80 watts/sq. inches and length sufficient to heat the water 16 within the tank to a desired temperature. A thermostat 30 operates the resistive heating element through a switch 30' incorporated in a switching section thereof to maintain the water within the tank to a desired preset temperature by switching the power to the resistive heating element on and off. In the present embodiment, an additional switch 29 is provided to supply power to the thermostat 30 and accordingly to the resistive heating element 11 when there is a need to heat water with electricity as opposed to gas. This switch 29 is controlled by a controller 31 which may be programmed to operate both the gas valve 23 and the switch 29 or the controller 31 may be controlled remotely by a utility or utility provider 32 through a wireless network communication link 33 or a wired link 34.

Figure 3:
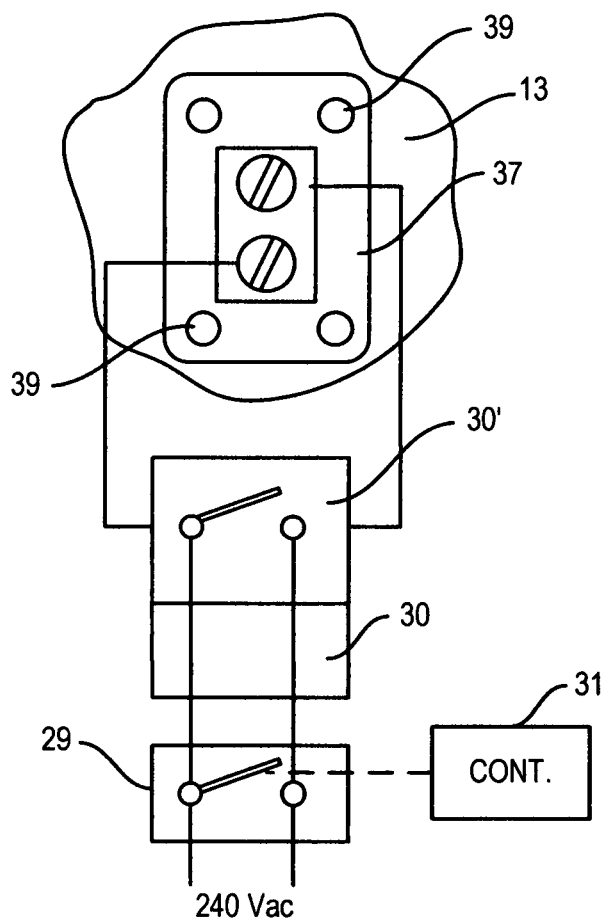
FIG. 3 is a plan view of the square flange mount of the resistive heating element and a schematic diagram of a thermostat and remote control switch connection thereto.
Figure 4:
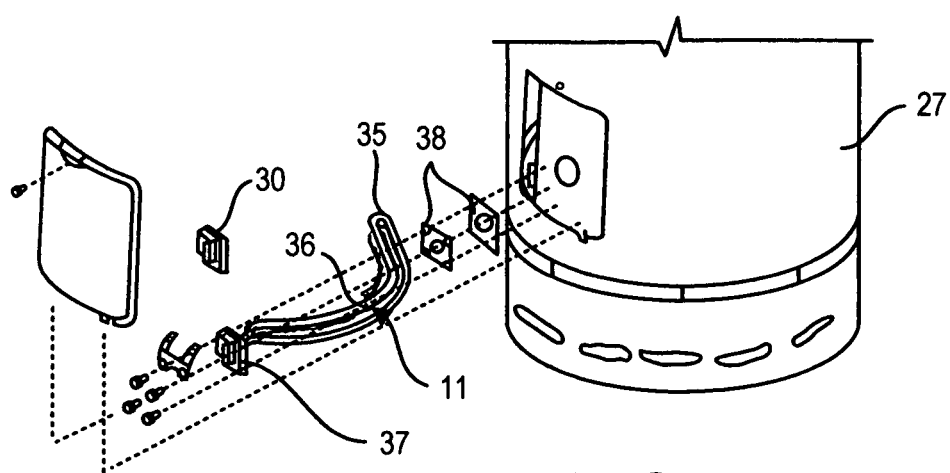
FIG. 4 is an exploded perspective view illustrating the mounting of the curved resistive heating element to a lower portion of the tank wall above the combustion chamber.

As shown in FIGS. 3 and 4, the curved resistive heating element 11 has a power rating of between 3000 and 4500 watts which is sufficient to heat the water in the tank up to at least 120 degrees F. and is formed as a loop defined by a curved end 35 and a parallel extension 36 terminating a short distance from its square flange mounting plate 37. The resistive heating element has a length of between 15 to 35 inches depending on its power rating. The square flange mounting plate 37 is secured to the tank wall by four bolts 39 and sealed by an electrically insulated seal assembly 38. When mounted, the resistive heating element 11 has a first curved section 11' which projects inside the tank between the dip tube 17' and the flue tube 24 and a second curved section 11" which is shaped to extend spaced about the flue tube 24 along a curve and disposed substantially central between the curved outer surface of the flue tube 24 and curved inner surface 13' of the tank side wall 13.

As shown in FIG. 1, in one of its applications, the dual energy gas water heater is controlled by a utility or provider 32 which can switch the operation of the water heater from a gas supply source to an electrical supply source. Accordingly, in seasons when there is an excessive demand for electricity, the water heater operates as a gas water heater and when electricity is not in high demand the water heater operates as an electric water heater, of course, taking cost into consideration and resulting in a benefit to both the customer and the utility. In another application, both sources of energy can be used simultaneously or in an alternative fashion. For example, the resistive heating element can be a stand-by resistive heating element to maintain the water temperature in the tank at a set temperature value during stand-by-periods of the water heater to prevent the gas burner from cycling on and off thereby resulting in gas saving and eliminating noise generated by the burner during night time when electricity costs are at their minimum, thus improving the efficiency of the water heater.

Figure 5:
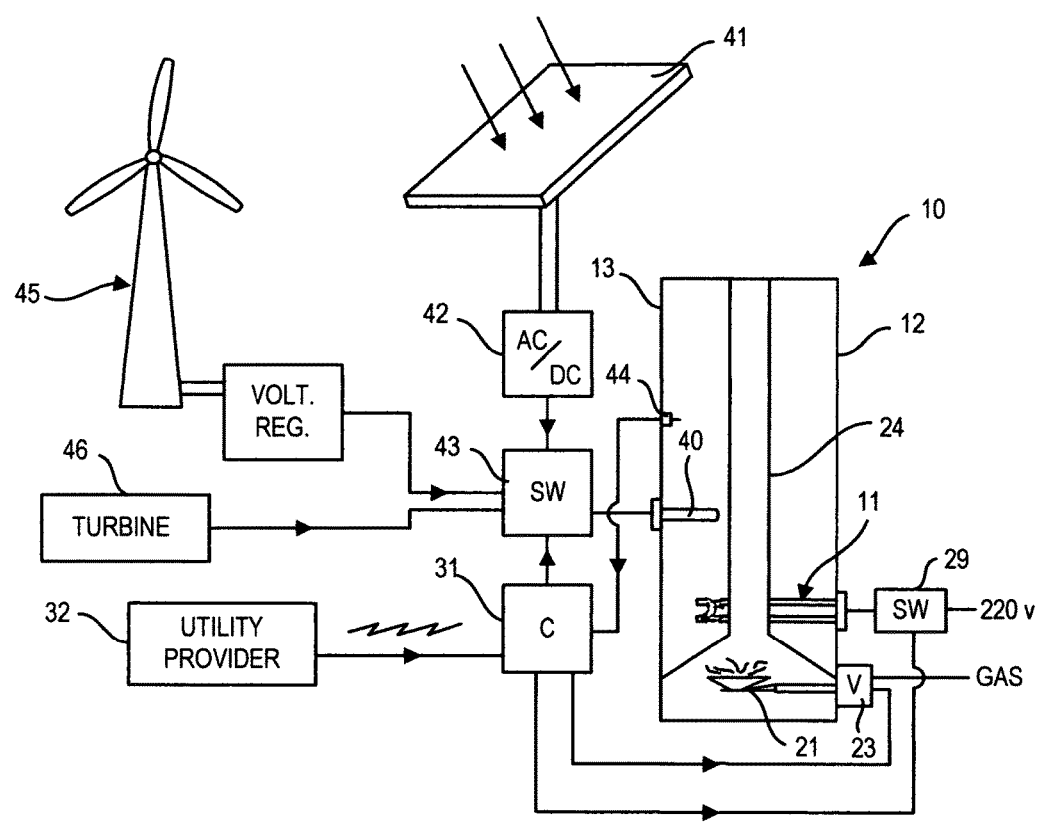
FIG. 5 is a simplified block diagram illustrating different renewable energy sources connected to a supplemental heating element secured to the tank wall and extending into the tank to heat water therein.

With reference now to FIG. 5 the dual energy water heater 10 is shown as being provided with a further electrical heating element 40 supported from the tank wall 13 and extending within the tank at a predetermined location, herein in a central portion of the tank. A renewable energy source, such as a roof top mounted solar panel 41 provides an additional source of electrical current to operate the element 40 and heat water in the tank. The solar panel has a voltage regulator 42 which is connected to a normally closed switch 43 which is operated by the controller 31 to switch the element 40 on and off in response to temperature signals received from a temperature probe 44 connected to the tank wall 13. Normally, the switch would be operated to maintain a threshold temperature of about 120 degrees F. in the upper portion of the tank. The renewable energy source can also be from a wind generator 45 of a wind or gas turbine 46. Accordingly, the dual energy gas water heater can operate as a multi-energy gas water heater controlled by the controller 31 and/or remotely by the utility 32. The control circuit 31 can be programmed to switch to different sources of energy, as required depending on water temperature or availability of energy and costs.

Summarizing, there is also provided a method of constructing a gas water heater as a dual energy source water heater by securing a curved resistive heating element 11 to a wall of the tank 13 of the water heater at a location spaced above the top wall 14 of the combustion chamber 15. The curved resistive heating element 11 has the characteristics and specification as described herein. The resistive heating element 11 is connected to a switch or switching circuit 29 operated by a controller 31 to connect and disconnect a voltage supply therefrom to provide for an alternative source of energy to heat water within the tank. When gas is in short supply or when electricity is less costly than gas, the water is heated by the resistive heating element. When electricity is in short supply the water heater operates with gas. Both sources can also be used at the same time as described above. The dual energy gas water heater can be operated by a programmed controller or remotely by the utility/provider.

It is within the ambit of the present invention to cover any modification of the preferred embodiment described herein, provided such modifications fall within the scope of the appended claims.

The invention claimed is:

1. A dual energy gas water heater comprising a tank for containment of water to be heated, a water inlet constituted by a dip tube is secured to said tank for receiving said water to be heated from a domestic water supply line, a water outlet in a top portion of said tank for feeding hot water to a hot water supply line, a combustion chamber in a lower portion of said tank, a gas burner in said combustion chamber, a gas supply line connected to said gas burner, a gas shut-off valve secured to said gas supply line, a flue tube sealingly secured between a top wall of said combustion chamber and a top wall of said tank and extending vertically throughout said tank for heat exchange with said water in said tank together with said top wall of said combustion chamber, a resistive heating element secured to a side wall of said tank in a lower portion of said tank above said combustion chamber, said resistive heating element being a curved resistive heating element having a first curved section which projects inside said tank between said dip tube and said flue tube and a second curved section which is shaped to extend spaced about said flue tube along a curve and disposed substantially central between a curved outer surface of said flue tube and said inner surface of said side wall of said tank, said resistive heating element having a length greater than the distance between the side wall of said tank to said flue tube, said curved resistive heating element having a density in the range of 20 to 80 watts/sq. inches for heating said water within said tank; a thermostat secured to said resistive heating element, a switch secured between said thermostat and a voltage supply line, a controller to selectively operate said switch and said gas valve to disconnect said voltage supply line from said thermostat and/or shut off said gas shut-off valve secured to said gas supply line.

2. The dual gas energy water heater as claimed in claim 1 wherein said controller is in communication with a utility/provider master controller to cause said controller to operate a selected one of said switch or gas shut-off valve.

3. The dual energy gas water heater as claimed in claim 2 wherein said resistive heating element is a resistor style element secured to a square flange support secured to said tank wall.

4. The dual energy gas water heater as claimed in claim 3 wherein said dip tube extends from said top wall of said tank to a bottom portion thereof spaced above said top wall of said combustion chamber.

5. The dual energy gas water heater as claimed in claim 2 wherein said utility/provider master controller is in wireless communication with said controller via a wireless network or in connected communication via a line network.

6. The dual energy gas water heater as claimed in claim 1 wherein said resistive heating element is a resistor style heating element having a power rating of between 3000 to 4500 watts.

7. The dual energy gas water heater as claimed in claim 1 wherein said dual energy water heater is a multi-energy water heater, and wherein a further electrical heating element is supported from said tank wall to extend within said tank at a predetermined location, a renewable energy source connected to said further electrical heating element through switch means.

8. The dual energy gas water heater as claimed in claim 7 wherein said renewable energy source connected to said switch means is a solar energy source.

9. The dual energy gas water heater as claimed in claim 7 wherein said switch means is automatically operated by a control circuit which operates said switch means which is a normally closed switch means, a temperature sensor secured to said tank to feed water temperature signals to said control circuit to operate a switch means to open said switch means upon said temperature sensor sensing a threshold temperature and automatically closing said switch means upon said temperature dropping to a temperature value below said threshold temperature.

10. The dual energy gas water heater as claimed in claim 9 wherein said threshold temperature is 120 degrees F.

11. The dual energy gas water heater as claimed in claim 7 wherein said predetermined location is in an upper portion of said tank.

12. The dual energy gas water heater as claimed in claim 7 wherein said renewable energy source is one of a solar energy source, a wind turbine energy source or a gas turbine energy source.

13. The dual energy gas water heater as claimed in claim 1 wherein a flue baffle is secured in said flue tube to retard hot flue gases from said combustion chamber to provide heat exchange of said flue gas within said flue tube with said water in said tank.

14. The dual energy gas water heater as claimed in claim 1 wherein said resistive heating element is a stand-by resistive heating element to maintain the water temperature in said tank at a set temperature value during a stand-by period of said dual energy gas water heater to prevent said gas burner from cycling on and off.

* * * * *